(12) United States Patent
Yang

(10) Patent No.: US 10,908,736 B2
(45) Date of Patent: Feb. 2, 2021

(54) METHOD AND SYSTEM FOR SETTING A TOUCH REPORT THRESHOLD, AND DISPLAY APPARATUS

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventor: Qing Yang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 11 days.

(21) Appl. No.: 16/517,413

(22) Filed: Jul. 19, 2019

(65) Prior Publication Data

US 2020/0026388 A1 Jan. 23, 2020

(30) Foreign Application Priority Data

Jul. 20, 2018 (CN) .......................... 2018 1 0803023

(51) Int. Cl.
*G06F 3/044* (2006.01)
*G06F 3/041* (2006.01)
*G09G 3/36* (2006.01)

(52) U.S. Cl.
CPC ............ *G06F 3/0418* (2013.01); *G06F 3/044* (2013.01); *G09G 3/3607* (2013.01)

(58) Field of Classification Search
CPC .... G06F 3/0418; G06F 3/044; G06F 3/04184; G09G 3/3607; G09G 2320/0285
See application file for complete search history.

(56) References Cited

U.S. PATENT DOCUMENTS

| 2005/0225565 | A1* | 10/2005 | Seong | ................... | G09G 3/2059 |
| | | | | | 345/611 |
| 2008/0036786 | A1* | 2/2008 | Tajiri | .................... | G09G 3/3659 |
| | | | | | 345/596 |
| 2013/0265320 | A1* | 10/2013 | Yamazaki | .............. | C09K 11/06 |
| | | | | | 345/589 |
| 2016/0246429 | A1* | 8/2016 | Ma | ........................ | G06F 3/0412 |
| 2018/0114483 | A1* | 4/2018 | Kim | .................... | H01L 27/3218 |

\* cited by examiner

*Primary Examiner* — Jennifer Mehmood
*Assistant Examiner* — James S Nokham
(74) *Attorney, Agent, or Firm* — McDermott Will & Emery LLP

(57) ABSTRACT

Disclosed is a method for setting a touch report threshold, by which touch report thresholds at different positions of a picture to be displayed may be adjusted in real time and dynamically, and the touch sensitivity of the touch panel is improved. The method includes: collecting gray scale variations of the picture to be displayed; dividing, according to the gray scale variations and N picture levels, the picture to be displayed into at least one picture unit; determining, according to a preset correspondence between gray scale variations and the N picture levels, a picture level of the picture unit; determining a touch sensor channel corresponding to the picture unit to determine the position of the picture unit; and adjusting, according to a preset correspondence between the N picture levels and touch report thresholds, a touch report threshold at the position of the picture unit in real time.

17 Claims, 9 Drawing Sheets

METHOD AND SYSTEM FOR SETTING A TOUCH REPORT THRESHOLD, AND DISPLAY APPARATUS

CROSS-REFERENCE TO RELATED APPLICATIONS

The present application claims priority to Chinese Patent Application No. 201810803023.4, filed to the China Patent Office on Jul. 20, 2018 and entitled "METHOD AND SYSTEM FOR SETTING A TOUCH REPORT THRESHOLD", the disclosure of which is hereby incorporated by reference in its entirety.

TECHNICAL FIELD

The disclosure relates to the technical field of display, and in particular to a method and system for setting a touch report threshold, and a display apparatus.

BACKGROUND

With the rapid development of technology, the touch technology is getting more and more extensive application. For example, at present, many display apparatuses such as ATMs, computers, mobile phones and digital cameras have a touch panel. With the popularity of touch products, users' requirements on the touch sensitivity of touch panels are increasingly higher.

SUMMARY

In a first aspect, a method for setting a touch report threshold is provided, and the method includes: collecting gray scale variations of a picture to be displayed; dividing, according to the gray scale variations and N picture levels, the picture to be displayed into at least one picture unit, wherein N is a positive integer and N is greater than or equal to 2; determining, according to a preset correspondence between gray scale variations and the N picture levels, a picture level corresponding to the at least one picture unit; determining a touch sensor channel corresponding to the at least one picture unit to determine a position of the at least one picture unit; and adjusting, according to a preset correspondence between the N picture levels and touch report thresholds, a touch report threshold at a position of at least one of the at least one picture unit in real time.

In some embodiments, dividing, according to the gray scale variations and N picture levels, the picture to be displayed into at least one picture unit, includes: performing following determination on all sub-pixels corresponding to the picture to be displayed one by one: determining whether there is at least one gray scale variation greater than or equal to $A \times j/N$ between a sub-pixel and sub-pixels around the sub-pixel, wherein A is a gray scale variation for a sub-pixel from all black to all white, N is the number of picture levels, j is a preset parameter and is greater than 0 and less than or equal to $N-1$, A, N and j are all positive integers; if for the sub-pixel, there is at least one gray scale variation greater than or equal to $A \times j/N$, counting the sub-pixel and recording gray scale variations of the sub-pixel; and if for the sub-pixel, there is no gray scale variation greater than or equal to $A \times j/N$, not counting the sub-pixel and performing determination on a next sub-pixel; determining whether a region where continuously counted sub-pixels are located has rows, the number of which is greater than that of rows of sub-pixels located in a preset region, and columns, the number of which is greater than that of columns of the sub-pixels located in the preset region; if so, determining the region where the continuously counted sub-pixels are located as a first picture unit; and if not, determining the region where the continuously counted sub-pixels are located as a second picture unit, wherein the preset region is within a minimum region of a touch panel in which noise of signals will affect the touch sensor; and determining, as a second picture unit, a region where sub-pixels that are not counted are located.

In some embodiments, each picture level corresponds to at least one gray scale variation, and a gray scale variation corresponding to an i-th picture level is less than a gray scale variation corresponding to an $(i-1)$-th picture level, wherein i is greater than or equal to 2 and less than or equal to N, and i is a positive integer.

In some embodiments, determining, according to a preset correspondence between gray scale variations and the N picture levels, a picture level corresponding to the at least one picture unit, includes: determining whether gray scale variations of each picture unit are within one of gray scale variation ranges; if the gray scale variations of the picture unit are within one of the gray scale variation ranges, determining, according to a preset correspondence between the gray scale variation ranges and the N picture levels, a picture level corresponding to the picture unit; and if at least one of the gray scale variations of the picture unit is not within one of the gray scale variation ranges, determining, according to the gray scale variations of the picture unit, a picture level corresponding to the picture unit.

In some embodiments, determining, according to the gray scale variations of the picture unit, a picture level corresponding to the picture unit, includes: for the first picture unit: counting the number of sub-pixels each having at least one gray scale variation greater than or equal to $A \times (N-k)/N$ in all sub-pixels in the first picture unit; determining whether the number of the sub-pixels is greater than or equal to a % of the number of sub-pixels in the first picture unit, wherein a is a positive integer; if so, determining a picture level corresponding the first picture unit as a k-th picture level, wherein k is greater than or equal to 1 and is a positive integer; if not, adding 1 to a value of k, and executing above steps again; and for the second picture unit: setting a picture level of the second picture unit as a $(j+1)$-th picture level.

In some embodiments, a first to m-th picture levels in the N picture levels are dead pixel picture levels, and picture units corresponding to the dead pixel picture levels are super heavy load picture units, wherein m is a positive integer and m is greater than or equal to 1 and less than or equal to N; adjusting a touch report threshold at the position of at least one of the at least one picture unit in real time, includes: determining, according to a picture level of the at least one picture unit, whether at least one of the at least one picture unit is at least one super heavy load picture unit; and if at least one of the at least one picture unit is at least one super heavy load picture unit, determining whether a ratio of an area of the at least one super heavy load picture unit to an area of the picture to be displayed is greater than or equal to b %, wherein b is a positive number; if the ratio of the area of the at least one super heavy load picture unit to the area of the picture to be displayed is greater than or equal to b %, adjusting a touch report threshold of the picture to be displayed to a touch report threshold corresponding to a picture unit with a first picture level; if the ratio of the area of the at least one super heavy load picture unit to the area of the picture to be displayed is less than b %, fitting an actual touch trajectory by using touch nodes around each super heavy load picture unit; and if any picture unit is not a super heavy load picture unit, determining the picture unit as a non-super heavy load picture unit.

In some embodiments, adjusting a touch report threshold at the position of the at least one picture unit in real time, further includes: for each non-super heavy load picture unit: determining, according to the preset correspondence between the N picture levels and the touch report thresholds, a touch report threshold corresponding to a picture level of the non-super heavy load picture unit, and adjusting a touch report threshold at a position of the non-super heavy load picture unit to the determined touch report threshold.

In some embodiments, adjusting a touch report threshold at the position of at least one of the at least one picture unit in real time further includes: for each non-super heavy load picture unit: determining whether the non-super heavy load picture unit is a light load picture unit, wherein n-th to N-th picture levels in the N picture levels are light load picture levels, and picture units corresponding to the light load picture levels are light load picture units, wherein n is greater than m and is less than or equal to N; if the non-super heavy load picture unit is a light load picture unit, adjusting a touch report threshold at a position of the light load picture unit to a touch report threshold corresponding to the n-th picture level; and if the non-super heavy load picture unit is not the light load picture unit, determining, according to the preset correspondence between the N picture levels and the touch report thresholds, a touch report threshold corresponding to a picture level of a non-light load picture unit in the non-super heavy load picture unit, and adjusting a touch report threshold at a position of the non-light load picture unit to the determined touch report threshold.

In some embodiments, the method further includes: determining the preset correspondence between the N preset picture levels and the touch report thresholds.

In some embodiments, determining the preset correspondence between the N preset picture levels and the touch report thresholds includes: selecting a touch panel sample; displaying, on the touch panel sample, pictures of the N picture levels one by one; testing a touch signal amount, which is caused by noise generated during a charge/discharge of driving transistor switch(es) in the touch panel sample, during displaying of a picture of each picture level of the N picture levels on the touch panel sample; and determining, according to the tested touch signal amount, a touch report threshold corresponding to the picture level.

In some embodiments, the touch panel sample is a touch panel sample having a maximum touch signal amount caused by noise when a same heavy load picture is displayed in all touch panel samples to be selected, wherein the heavy load picture is a picture having gray scale variations greater than a set value.

In some embodiments, a touch report threshold corresponding to each picture level is greater than a corresponding touch signal amount.

In some embodiments, for each picture, steps of the method for setting a touch report threshold are at least executed once.

In a second aspect, a system for setting a touch report threshold is provided, and the system includes: a memory configured to store a preset correspondence between gray scale variations and N picture levels and a preset correspondence between the N picture levels and touch report thresholds, wherein N is a positive integer and N is greater than or equal to 2; and a processor coupled to the memory and configured to: collect gray scale variations of a picture to be displayed; divide, according to the gray scale variations and the N picture levels, the picture to be displayed into at least one picture unit, determine, according to the preset correspondence between gray scale variations and N picture levels, a picture level corresponding to the at least one picture unit; determine a touch sensor channel corresponding to the at least one picture unit to determine a position of the at least one picture unit; and adjust, according to the preset correspondence between the N picture levels and touch report thresholds, a touch report threshold at a position of at least one of the at least one picture unit in real time.

In some embodiments, a collection frequency of the processor is greater than or equal to a frame frequency for picture displaying.

In some embodiments, the memory is integrated in a touch chip of a touch panel.

In a third aspect, a non-transitory computer-readable storage medium is provided, storing executable instructions that, when executed by a processor, enables the processor to execute the method for setting a touch report threshold described in the above aspect.

In a fourth aspect, a display apparatus is provided, and the display apparatus includes: a memory, configured to store a preset correspondence between gray scale variations and N picture levels and a preset correspondence between the N picture levels and touch report thresholds, wherein N is a positive integer and N is greater than or equal to 2; a processor, coupled to the memory and configured to: collect gray scale variations of a picture to be displayed; divide, according to the gray scale variations and N picture levels, the picture to be displayed into at least one picture unit; determine, according to the preset correspondence between gray scale variations and N picture levels, a picture level corresponding to the at least one picture unit; determine a touch sensor channel corresponding to the at least one picture unit to determine a position of the at least one picture unit; and adjust, according to the preset correspondence between the N picture levels and the touch report thresholds, a touch report threshold at a position of at least one of the at least one picture unit in real time; and a display panel coupled to the processor, wherein the display panel is configured to display a picture with at least one adjusted touch report threshold.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Herein, an on-cell display apparatus refers to a display apparatus in which a touch panel is physically embedded between a color filter substrate and a polarizer, and an in-cell display apparatus refers to a display apparatus in which a touch panel is functionally embedded in a liquid crystal display (LCD) cell. The display apparatus includes a display panel, and the display panel may include the touch panel or may not include the touch panel. Noise refers to interference signals to the touch panel during a display of a picture on the display panel, and the interference signals are generated by the charge/discharge of driving switch(s) (for example, thin-film transistor(s)) in the display panel. Reporting of a touch point (hereinafter referred to as reporting) is a process in which, when a user touches the touch panel, the processor compares the change in capacitance of a capacitor disposed in the touch panel with a preset threshold to detect which point is touched.

In the related art, since the display apparatus with the same touch panel has different noise when displaying different pictures, during the conventional setting of a touch report threshold, a touch signal amount (for example, capacitance data jitter) under maximum noise in the application environment is used as a reference, with a certain redundancy reserved (for example, 80%, that is, 80% of the touch report threshold is equal to the capacitance data jitter caused by maximum noise), in order to ensure that no wrong reporting will occur in the touch panel under maximum noise. Considering noise, the touch report threshold of the touch panel cannot be set too low. Therefore, in the prior art, generally, a single threshold is set for a whole touch panel by considering a touch signal amount corresponding to a region with maximum noise of the whole touch panel.

However, when the touch signal amount caused by the noise is great, the set touch report threshold will be high. Furthermore, since the whole touch panel corresponds to a single touch report threshold, the touch sensitivity of the touch panel is low.

Figure 1:
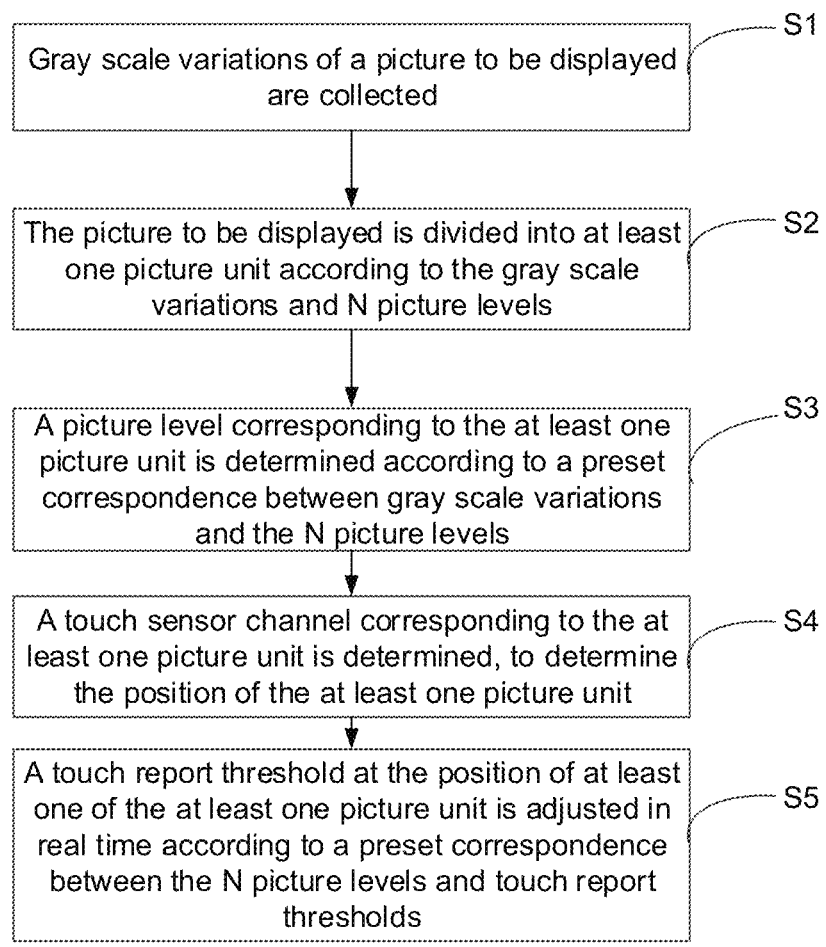
FIG. 1 is a flowchart of a method for setting a touch report threshold, in accordance with some embodiments.

In view of the above problem, some embodiments of the present disclosure provide a method for setting a touch report threshold. As shown in FIG. 1, the method includes S1 to S5.

In S1, gray scale variations of a picture to be displayed are collected.

In some examples, the gray scale variation refers to a difference between a gray scale of a sub-pixel in all sub-pixels corresponding to the picture to be displayed and a gray scale of another sub-pixel adjacent to this sub-pixel. In some examples, the gray scale variation refers to a difference between a gray scale of a pixel in all pixels corresponding to the picture to be displayed and a gray scale of another pixel adjacent to this pixel. The following embodiments will be described by taking, as an example, the gray scale variation being a difference between the gray scale of a sub-pixel in all sub-pixels corresponding to the picture to be displayed and the gray scale of another sub-pixel adjacent to this sub-pixel.

In some embodiments, for the display panel having a gray scale variation range of 0 to 255 from all black to all white, when all sub-pixels display all black, the gray scale of all sub-pixels is 0, and when all sub-pixels display all white, the gray scale of all sub-pixels is 255. In some examples, a gray scale of a first sub-pixel L10 is 10, a gray scale of a second sub-pixel L240 adjacent to the first sub-pixel L10 is 240, and a gray scale of a third sub-pixel L20 adjacent to the first sub-pixel L10 is 20. In this case, a difference between the gray scale of the first sub-pixel L10 and the gray scale of the second sub-pixel L240 is 230, that is, the gray scale variation is 230, which is great. A difference between the gray scale of the first sub-pixel L10 and the gray scale of the third sub-pixel L20 is 10, that is, the gray scale variation is 10, which is small.

In S2, the picture to be displayed is divided into at least one picture unit according to the gray scale variations and N picture levels. N is a positive integer and N is greater than or equal to 2.

In some embodiments, the picture to be displayed is divided into a single picture unit. In this case, the picture unit is the whole picture to be displayed. In some embodiments, the picture to be displayed is divided into a plurality of picture units. In this case, the picture unit is a part of the picture to be displayed.

In S3, a picture level corresponding to the at least one picture unit is determined according to a preset correspondence between gray scale variations and the N picture levels.

In some embodiments, each picture level corresponds to at least one gray scale variation. A gray scale variation corresponding to an i-th picture level is less than a gray scale variation corresponding to an (i−1)-th picture level. In this case, i is greater than or equal to 2 and less than or equal to N, and i is a positive integer.

For example, N picture levels are eight picture levels. Gray scale variations of a picture unit corresponding to a second picture level are less than gray scale variations of a picture unit corresponding to a first picture level.

In S4, a touch sensor channel corresponding to the at least one picture unit is determined, to determine the position of the at least one picture unit.

In some embodiments, the touch sensor channel refers to the position of a touch sensor, which may be represented by coordinates (Tx, Rx).

In S5, a touch report threshold at the position of at least one of the at least one picture unit is adjusted in real time according to a preset correspondence between the N picture levels and touch report thresholds.

When a user touches the touch panel, during the reporting of a touch point (reporting), the processor compares the change in capacitance of the touch panel with a preset threshold to detect which point is touched. The preset threshold is the touch report threshold.

In the method for setting a touch report threshold as provided in the embodiments of the present disclosure, by determining the picture level corresponding to at least one picture unit by using gray scale variations of the picture to be displayed and by determining information about the position of the at least one picture unit, a touch report threshold at the position of at least one picture unit is adjusted in real time and dynamically. Therefore, the effect of the noise on the touch report threshold is reduced, and the touch sensitivity of the touch panel is improved.

Figure 2:
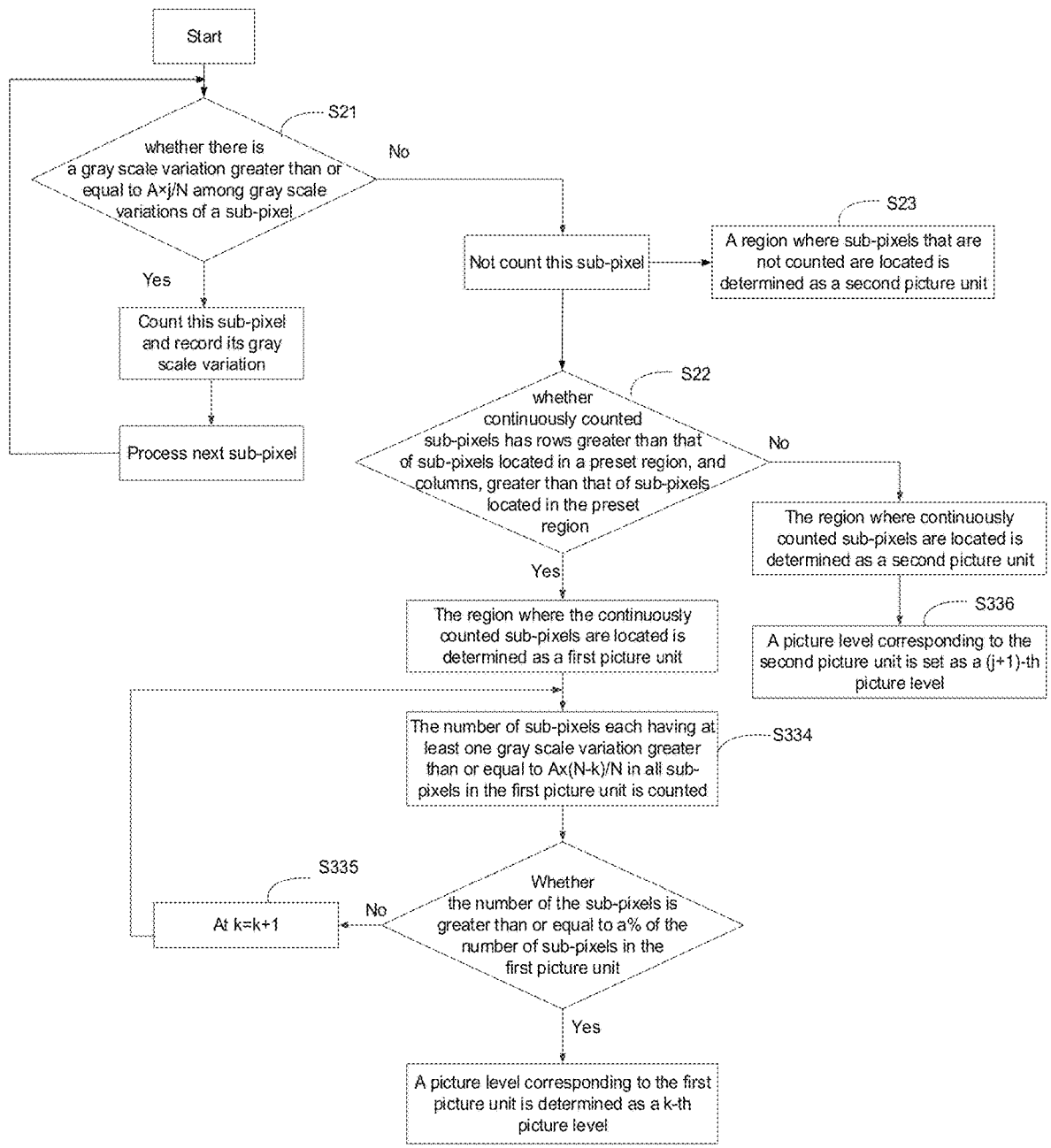
FIG. 2 is a flowchart of identifying at least one first picture unit and/or at least one second picture unit from a picture to be displayed, and determining a picture level of the picture unit, in accordance with some embodiments.

In some embodiments, as shown in FIG. 2, the S2, in which the picture to be displayed is divided into at least one picture unit according to the gray scale variations and N picture levels, includes S21 to S23.

In S21, following determination is performed on all sub-pixels corresponding to the picture to be displayed one by one: it is determined whether there is at least one gray scale variation greater than or equal to $A \times j/N$ (i.e., a quotient of a product of A and j divided by N) among gray scale variations between a sub-pixel and sub-pixels around the sub-pixel. A is a gray scale variation for a sub-pixel from all black to all white, N is the number of picture levels, and j is a preset parameter and is greater than 0 and less than or equal to N−1. A, N and j are all positive integers. If for the sub-pixel, there is at least one gray scale variation greater than or equal to $A \times j/N$, the sub-pixel is counted and gray scale variations of this sub-pixel are recorded. If for the sub-pixel, there is no gray scale variation greater than or equal to $A \times j/N$, the sub-pixel is not counted. Then, a next sub-pixel is determined according to the above steps.

In some embodiments, a gray scale variation for each sub-pixel in the picture to be displayed from all black to all white is 256 (i.e., A=256), and there are eight picture levels (i.e., N=8). When the gray scale variations between a sub-pixel and sub-pixels around this sub-pixel are less than 128, the effect of the noise on the touch report threshold is low. Therefore, it is preset that j is equal to 4 according to the formula $A \times j/N$.

For example, starting from the first sub-pixel in the picture to be displayed, if there is at least one gray scale variation greater than or equal to $A \times j/N$ between this sub-pixel and sub-pixels around this sub-pixel, i.e., greater than or equal to 128, the sub-pixel is counted and the gray scale variations between this sub-pixel and sub-pixels around this sub-pixel are recorded. If the gray scale variations between the first sub-pixel and sub-pixels around this sub-pixel are less than 128, this sub-pixel is not counted. The above determination is successively performed on the subsequent sub-pixels.

In S22, it is determined whether a region where continuously counted sub-pixels are located has rows, the number of which is greater than that of rows of sub-pixels located in a preset region, and columns, the number of which is greater than that of columns of sub-pixels located in the preset region. If so, the region where the continuously counted sub-pixels are located is determined as a first picture unit. If not, the region where continuously counted sub-pixels are located is determined as a second picture unit. The preset region is within a minimum region in a touch panel in which noise of signals will affect the touch sensor. In some embodiments, the preset region is a region having x rows of sub-pixels and y columns of sub-pixels. A minimum region in a touch panel in which noise of signals will affect the touch sensor is, for example, a region consisting of X rows of sub-pixels and Y columns of sub-pixels. In this case, x is less than or equal to X and y is less than or equal to Y. In some examples, at x=40 and y=40, it is determined whether a region where continuously counted sub-pixels are located has more than 40 rows and more than 40 columns. If so, the region where the continuously counted sub-pixels are located is determined as the first picture unit. If not, the region where the continuously counted sub-pixels are located is determined as the second picture unit. For example, a certain touch sensor is 5 mm×5 mm (that is, the length is 5 mm and the width is 5 mm). At a certain resolution, the touch sensor can cover 80 ×80 sub-pixels (that is, the number of each row of sub-pixels is 80, and the number of each column of sub-pixels is 80). When continuously counted sub-pixels include no more than a X×Y=40× 40 sub-pixels, the resulting noise has low effect on the touch sensor. Therefore, the region where the continuously counted sub-pixels including no more than 40×40 sub-pixels are located is determined as the second picture unit. The values of x and y are set according to a minimum area in which noise will affect the touch sensor, for example, 30×30 and 50×50, which will not be limited herein. In S23, a region where sub-pixels that are not counted are located is determined as a second picture unit.

Since there may be many sub-pixels that are not counted during the determination process, many discontinuous first picture units and/or second picture units may be formed.

In addition, if there are no continuously counted sub-pixels, the picture to be display is determined as a second picture unit.

Figure 3:
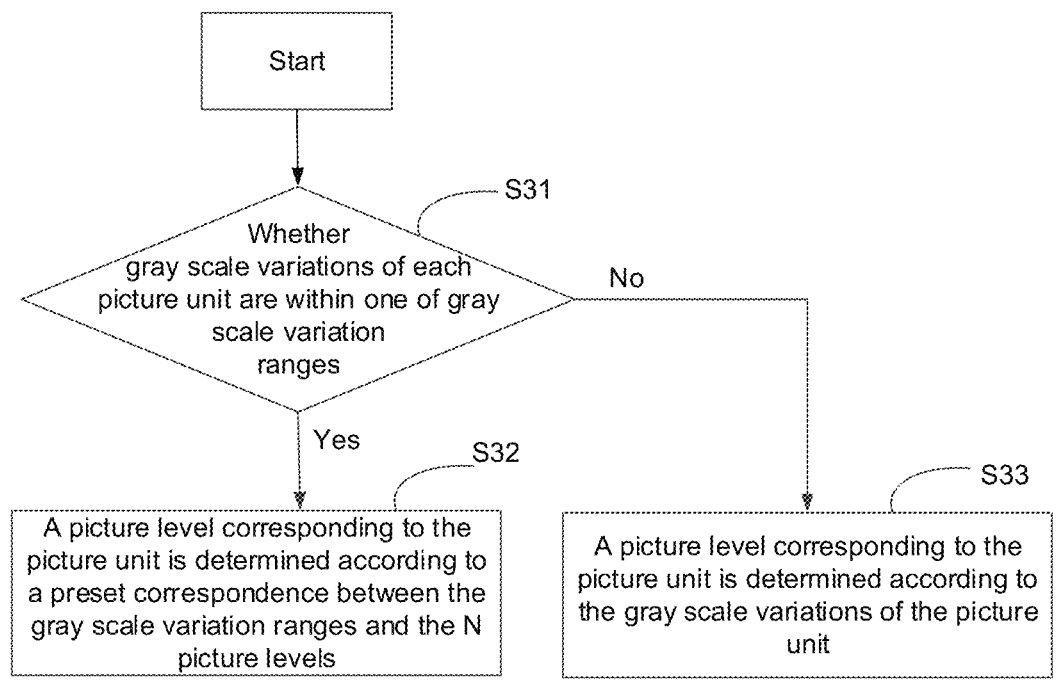
FIG. 3 is a flowchart of determining, according to a preset correspondence between gray scale variations and N picture levels, a picture level corresponding to each picture unit, in accordance with some embodiments.

In some embodiments, as shown in FIG. 3, the S3, in which a picture level corresponding to the at least one picture unit is determined according to a preset correspondence between gray scale variations and the N picture levels, includes S31 to S33.

In S31, it is determined whether gray scale variations of each picture unit are within one of gray scale variation ranges.

In S32, if the gray scale variations of the picture unit are within one of the gray scale variation ranges, a picture level corresponding to the picture unit is determined according to a preset correspondence between the gray scale variation ranges and the N picture levels.

In some examples, three gray scale variation ranges are 0-50, 50-100 and 100-150. The picture levels corresponding to these gray scale variation ranges are the eighth picture level, the seventh picture level and the sixth picture level, respectively. If gray scale variations of a picture unit are less than 25, it can be determined that the gray scale variations of this picture unit are within the gray scale variation range 0-50, and thus the picture level corresponding to the picture unit is the eighth picture level.

In S33, if at least one of gray scale variations of the picture unit is not within one of the gray scale variation ranges, a picture level corresponding to the picture unit is determined according to the gray scale variations of the picture unit.

In some embodiments, as shown in FIG. 2, determining a picture level corresponding to the picture unit according to gray scale variations corresponding to the picture unit, includes the following steps.

For the first picture unit:

In S334, the number of sub-pixels, at least one gray scale variation of each of which is greater than or equal to A×(N−k)/N (i.e., a quotient of a product of A and (a difference between N and k) divided by N), in all sub-pixels in the first picture unit is counted, and it is determined whether the number of the sub-pixels is greater than or equal to a % of the number of sub-pixels in the first picture unit. In this case, a is a positive integer. If so, a picture level corresponding to the first picture unit is determined as a k-th picture level. k starts at 1 and is a positive integer. If not, S335 is performed.

In S335, at k=k+1, S334 is performed again, until the picture level corresponding to the first picture unit is determined.

For the second picture unit:

In S336, a picture level corresponding to the second picture unit is set as a (j+1)-th picture level.

In some examples, A=256, N=8 and a %=80%. For a determined first picture unit, at k=1, the number of sub-pixels, at least one gray scale variation of each of which is greater than or equal to A*(N−k)/N, in all sub-pixels in the first picture unit is counted, that is, the number of sub-pixels each having at least one gray scale variation greater than or equal to 224 (that is, 256*(8−1)/8) is counted. If the number of sub-pixels is greater than or equal to 80% of the number of sub-pixels in this first picture unit, the picture level corresponding to this first picture unit is determined as the first picture level. If the number of sub-pixels, at least one gray scale variation of each of which is greater than or equal to 224, is less than 80% of the number of sub-pixels in this first picture unit, it is still determined whether the picture level of this first picture unit is the second picture level. That is, at k=2, the number of sub-pixels each having at least one gray scale variation greater than or equal to 192 in all sub-pixels in the first picture unit is counted. If the number of sub-pixels is greater than or equal to 80% of the number of sub-pixels in this first picture unit, the picture level of this first picture unit is determined as the second picture level. The above step is repeated until the picture level of this first picture unit is determined. The determination of other first picture units is similar, which will not be elaborated here.

It will be noted that a % in this step may be adjusted by a person of ordinary skill in the art according to actual need. Exemplarily, a % may be within a range from 50% to 100%, for example, 50%, 60%, 65%, 70%, 75%, 85%, 90%, which will not be limited herein.

Figure 4:
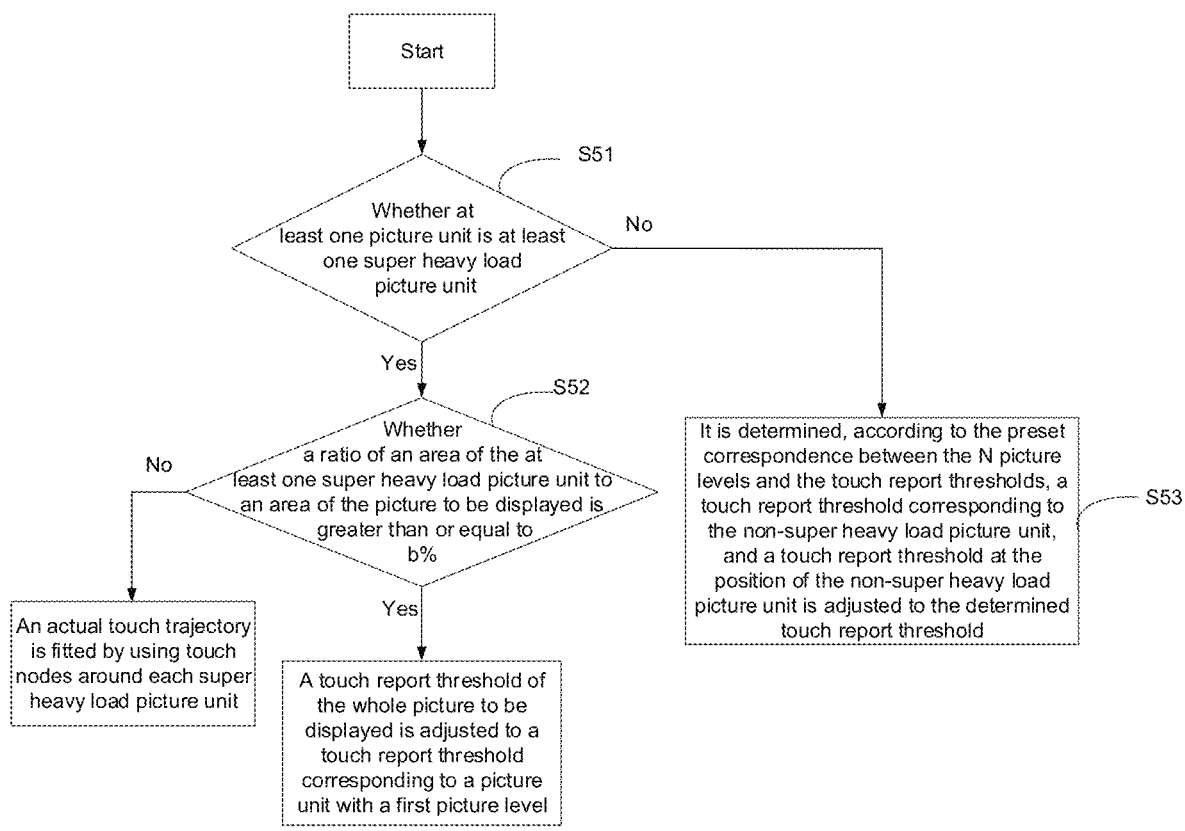
FIG. 4 is a flowchart of adjusting a touch report threshold at a position of at least one of the at least one picture unit in real time, in accordance with some embodiments.

In some embodiments, as shown in FIG. 4, the first to m-th picture levels in the N picture levels are dead pixel picture levels, and picture units corresponding to the dead pixel picture levels are super heavy load picture units. In this case, m is a positive integer and m is greater than or equal to 1 and less than or equal to N.

The S5, in which a touch report threshold at the position of at least one of the at least one picture unit is adjusted in real time, includes S51 and S52.

In S51, it is determined whether at least one of the at least one picture unit is at least one super heavy load picture unit according to a picture level of the at least one picture unit.

The picture unit may be a super heavy load picture unit or a non-super heavy load picture unit, and the non-super heavy load picture unit may be a light load picture unit or a heavy load picture unit. Hereinafter, the light load picture unit, the heavy load picture unit and the super heavy load picture unit are described.

When a picture is displayed on the display panel, noise will occur in the touch panel due to the charge/discharge of driving switch(es) (for example, thin-film transistor(s)). For example, when a certain picture is displayed, two adjacent sub-pixels are represented by L255 and L0, and a gray scale level signal transmitted by a source electrode of a thin-film transistor skips from 4.5V at L255 to 0.2V at L0. The coupling capacitance existing between the source electrode of the thin-film transistor and the common voltage layer of the touch panel pulls the voltage at the common voltage layer. For the on-cell display apparatus or the in-cell display apparatus, pulling the voltage at the common voltage layer will synchronously influence the electric field of the touch panel, thereby resulting noise.

Herein, the light load picture unit refers to a picture unit in which the voltage at the common voltage layer is less pulled and low noise is resulted, i.e., a sub-picture with small gray scale variations. The heavy load picture unit refers to a picture unit in which the voltage at the common voltage layer is greatly pulled and high noise is resulted, i.e., a sub-picture with great gray scale variations. The super heavy load picture unit refers to a picture unit in which the voltage at the common voltage layer is significantly pulled by the source electrode of the thin-film transistor and quite high noise is resulted, i.e., a sub-picture with quite great gray scale variations.

Figure 7:
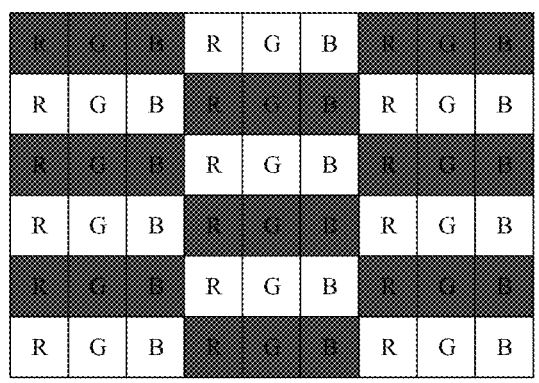
FIG. 7 is a schematic view of a skip pixel picture in the method for setting a touch report threshold, in accordance with some embodiments.
Figure 8:
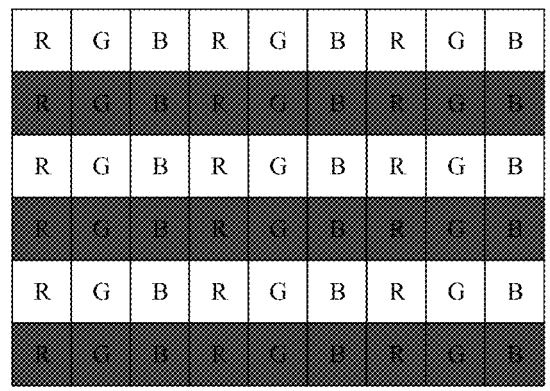
FIG. 8 is a schematic view of a skip 1V line picture in the method for setting a touch report threshold, in accordance with some embodiments.
Figure 9:
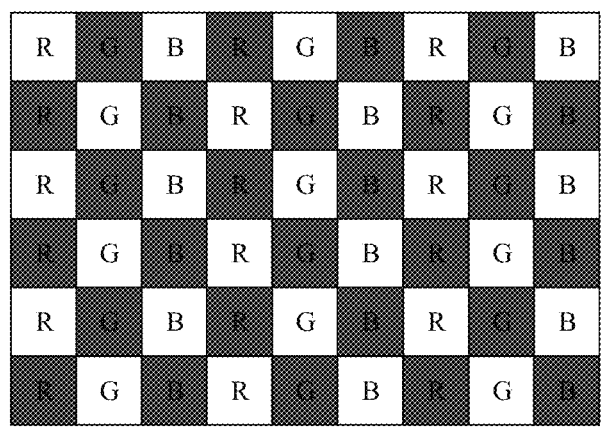
FIG. 9 is a schematic view of a skip sub-pixel picture in the method for setting a touch report threshold, in accordance with some embodiments.

In some examples, in a LCD panel of column inversion driving mode, each pixel includes a red sub-pixel R, a green sub-pixel G and a blue sub-pixel B. In this case, for example, the white, red, green and blue picture units are light load picture units. For example, a skip pixel picture unit (a picture unit in which bright pixels and dark pixels in a same row are arranged alternately and bright pixels and dark pixels in a same column are arranged alternately) as shown in FIG. 7 and a skip 1V line picture unit (a picture in which a row of bright sub-pixels and a row of dark sub-pixels are arranged alternately) as shown in FIG. 8 are heavy load picture units. For example, a skip sub-pixel picture unit (a picture in which bright sub-pixels and dark sub-pixels in a same row are arranged alternately and bright sub-pixels and dark sub-pixels in a same column are arranged alternately) as shown in FIG. 9 is a super heavy load picture unit. The light load picture unit, the heavy load picture unit and the super heavy load picture unit can be divided by a person of ordinary skill in the art according to the actual properties of the touch panel and the condition of the displayed picture, which will not be limited herein.

In S52, if at least one of the at least one picture unit is at least one super heavy load picture unit, it is determined whether a ratio of an area of the at least one super heavy load picture unit to an area of the picture to be displayed is greater than or equal to b %. In this case, b is a positive number. If the ratio of the area of the at least one super heavy load picture unit to the area of the picture to be displayed is greater than or equal to b %, a touch report threshold of the whole picture to be displayed is adjusted to a touch report threshold corresponding to a picture unit with a first picture level. If the ratio of the area of the at least one super heavy load picture unit to the area of the picture to be displayed is less than b %, an actual touch trajectory is fitted by using touch nodes around each super heavy load picture unit.

It is assumed that a touch signal caused by a normal touch by a finger is 100. If the picture to be displayed is a super heavy load picture unit, the touch signal amount generated in the touch panel due to noise has approached or exceeded 100. In this case, it is needed to reduce the accident touch operations caused by the noise in the picture to be displayed.

In some examples, eight picture levels are preset and the first picture level is a dead pixel picture level. During the picture display process, if the picture units in the whole picture are all or almost all super heavy load picture units, the touch report thresholds of the touch sensors for the whole picture may be increased to a higher value. This value is, for example, a touch report threshold corresponding to a picture unit with the first picture level. Alternatively, this value is on a multiple of a touch report threshold corresponding to a picture unit with the eighth picture level. Alternatively, this value is another high value that will not influence the touch experience. In this way, when it is going to display a large-area super heavy load picture, the normal touch effect by a finger can be ensured, avoiding disconnection or accident operation on the touch panel.

In some embodiments, b % is 80%. If the area of the at least one super heavy load picture unit is less than 80% of the area of the whole picture to be displayed, the touch report thresholds at the positions of the at least one super heavy load picture unit, at least one heavy load picture unit and at least one light load picture units may be increased or reduced flexibly, according to their specific levels. Of course, b % may be adjusted according to the actual need, exemplarily, within a range from 50% to 100%, for example, 50%, 60%, 65%, 70%, 75%, 85%, 90%, which will not be limited herein.

In some embodiments, as shown in FIG. 4, the S5, in which a touch report threshold at the position of at least one of the at least one picture unit is adjusted in real time, further includes S53.

In S53, for each non-super heavy load picture unit (i.e., a heavy load picture unit or a light load picture units), it is determined, according to the preset correspondence between the N picture levels and the touch report thresholds, a touch report threshold corresponding to a picture level of the non-super heavy load picture unit, and a touch report threshold at the position of the non-super heavy load picture unit is adjusted to the determined touch report threshold.

Figure 5:
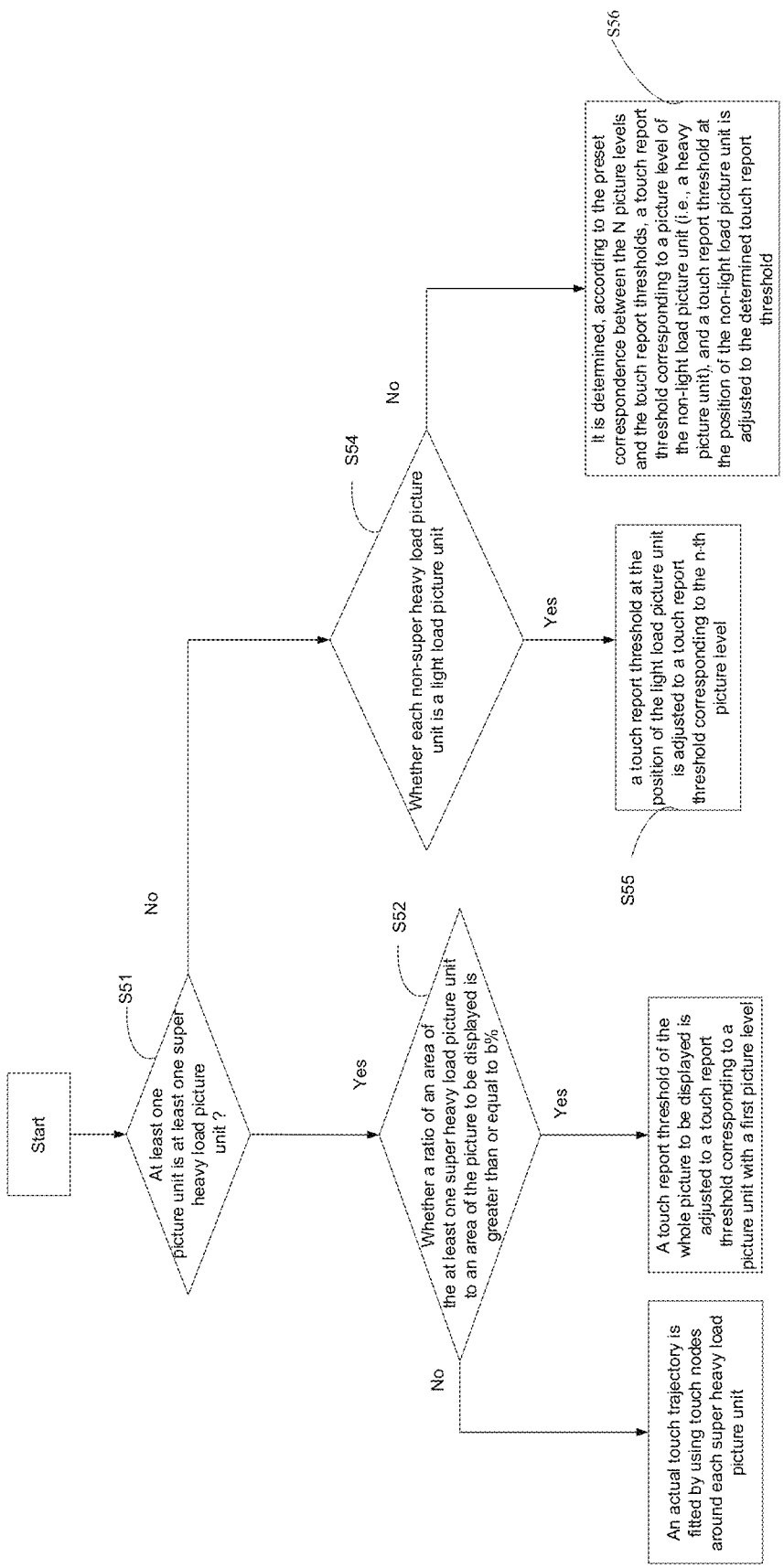
FIG. 5 is another flowchart of adjusting a touch report threshold at a position of at least one of the at least one picture unit in real time, in accordance with some embodiments.

In some other embodiments, as shown in FIG. 5, the S5, in which a touch report threshold at the position of at least one of the at least one picture unit is adjusted in real time, further includes S54 to 56.

In S54, for each non-super heavy load picture unit, it is determined whether it is a light load picture unit. The n-th to N-th picture levels in the N picture levels are light load picture levels, and picture units corresponding to the light load picture levels are light load picture units. In this case, n is greater than m and is less than or equal to N.

In S55, if the non-super heavy load picture unit is a light load picture unit, a touch report threshold at the position of the light load picture unit is adjusted to a touch report threshold corresponding to the n-th picture level.

In S56, if the non-super heavy load picture unit is not the light load picture unit, it is determined, according to the preset correspondence between the N picture levels and the touch report thresholds, a touch report threshold corresponding to a picture level of the non-light load picture unit (i.e., a heavy picture unit), and a touch report threshold at the position of the non-light load picture unit is adjusted to the determined touch report threshold.

In some embodiments, the sensing capability of the touch sensor depends upon the contact area between the finger of the user and the touch panel. Swiping on or pressing the touch panel causes the touch sensing electrodes around the coordinates of the touch point to receive a touch signal. The touch sensor node at the coordinates of the touch point has a maximum signal amount (for example, the dark region shown in FIG. 10A), and the sensor nodes around the coordinates of the touch point have a small signal amount (for example, the light regions shown in FIG. 10A).

Figure 10A:
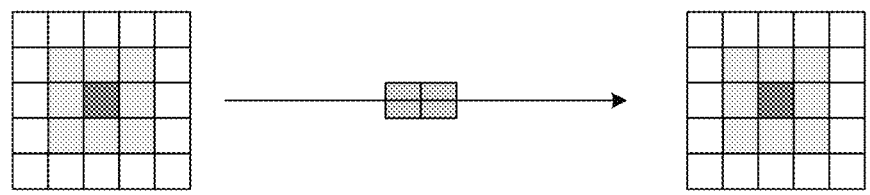
FIG. 10A is a schematic view of a user's touch display screen, in accordance with some embodiments.

A case in which there are eight picture levels and the first picture level being a dead pixel picture level is taken as an example. In FIG. 10A, the user's finger touches the display screen normally. When there is a large press area, for example, when the screen is touched by the thumb, the thumb swipes in a direction indicated by the arrow in FIG. 10A, starting from a light load picture unit of the eighth picture level, through a heavy load picture unit of the third picture level with high noise, and then through a light load picture unit of the seventh picture level. Touch report thresholds corresponding to the three picture units are touch report thresholds corresponding to the eighth picture level, the third picture level and the seventh picture level in the swiping direction, respectively.

Figure 10B:
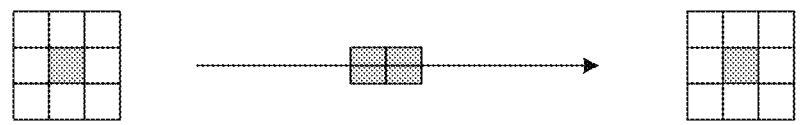
FIG. 10B is another schematic view of a user's touch display screen, in accordance with some embodiments.

In FIG. 10B, the user's finger touches the display screen in a small area. When there is a small press area, for example, when the screen is touched by the pinkie, the pinkie swipes in a direction indicated by the arrow in FIG. 10B, starting from a light load picture unit of the eighth picture level, through a heavy load picture unit of the third picture level with high noise, and then through a light load picture unit of the seventh picture level. Similarly to FIG. 10A, the touch report thresholds are touch report of the three picture units thresholds corresponding to the eighth picture level, the third picture level and the seventh picture level in the swiping direction, respectively.

From FIG. 10A and FIG. 10B, it can be known that the pressing and swiping of the thumb and pinkie on the screen are both effective and the sensing capability of pressing by the thumb is greater, if there is no super heavy load picture.

Figure 10C:
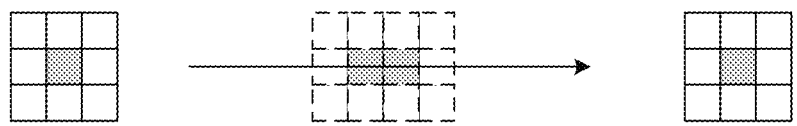
FIG. 10C is still another schematic view of a user's touch display screen, in accordance with some embodiments.

In FIG. 10C, the user's finger touches the display screen in a small area. When there is a small press area, the finger swipes in a direction indicated by the arrow in FIG. 10C, starting from a light load picture unit of the eighth picture level, through a super heavy load picture unit of the first picture level with quite high noise, and then through a light load picture unit of the seventh picture level. The touch report thresholds of the three picture units are touch report thresholds corresponding to the eighth picture level, the dead pixel picture level and the seventh picture level in the swiping direction, respectively.

Since the sensing capability caused by noise from the super heavy load picture unit has exceeded the sensing capability caused by normal touch, a denial region is set on the touch panel. Reporting is prevented in this region. That is, dead pixels are set manually. After a picture level is determined, the threshold of this region is increased so that wrong reporting of noise cannot be output. For a region having a super heavy load picture unit, when a picture level of the picture unit in the region corresponding to a touch sensor node at the coordinates of the touch point is the first picture level, the touch signal received by the touch electrode in this region is suppressed and determined as an invalid signal. And, when the picture level of the picture unit around the coordinates of the touch point is greater than the first picture level, the signal received by the touch electrode is a valid signal. Therefore, coordinates of an actual touch position can be fitted by the touch signal received by electrodes around the coordinates of the touch point. The super heavy load picture unit is isolated as a dead pixel in order to prevent wrong reporting, while ensuring the normal touch in other regions.

In some embodiments, the method for setting a touch report threshold further includes determining the preset correspondence between the N picture levels and the touch report thresholds.

Figure 6:
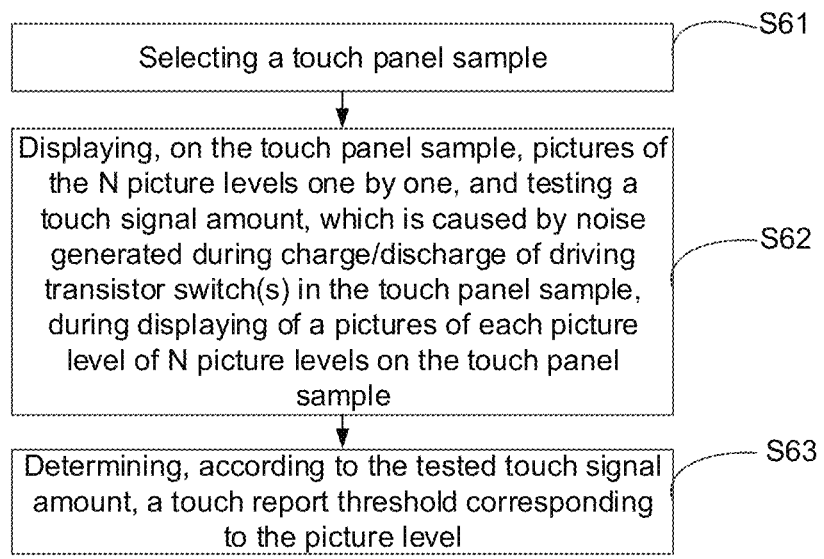
FIG. 6 is a flowchart of determining a preset correspondence between N picture levels and touch report thresholds, in accordance with some embodiments.

In some embodiments, as shown in FIG. 6, determining the correspondence between the preset picture levels and the touch report thresholds, includes:

S61: selecting a touch panel sample;

S62: displaying, on the touch panel sample, pictures of the N picture levels one by one, and testing a touch signal amount, which is caused by noise generated during charge/discharge of driving transistor switch(es) in the touch panel sample, during displaying of a pictures of each picture level of N picture levels on the touch panel sample; and S63: determining, according to the tested touch signal amount, a touch report threshold corresponding to the picture level.

In some embodiments, the selected touch panel sample is a touch panel sample having a maximum touch signal amount caused by noise when a same heavy load picture is displayed on all touch panel samples to be selected. The heavy load picture is a picture having gray scale variations greater than a set value. This set value can be set according to actual needs.

In some embodiments, during the manufacture of a large panel (for example, a large piece of liquid crystal glass, containing a plurality of touch panels), there is a slight difference in properties of the panels at different positions. A panel having a maximum touch signal amount caused by noise is sampled, so that the set relation between different picture levels and the corresponding touch report thresholds is generally applicable to the whole large panel. For example, it is assumed that the plurality of touch panels in the large panel display a same skip pixel picture, and a touch panel having a maximum touch signal amount caused by noise is found, as the touch panel sample.

In some embodiments, during the process of determining the preset correspondence between N picture levels and touch report thresholds, the known light load pictures, heavy load pictures and super heavy load pictures are displayed as many as possible by the touch panel sample and the touch signal amounts caused by the noise in the different pictures are collected. Then, the pictures are divided into picture levels according to the touch signal amount, and the touch report threshold corresponding to each picture level is determined.

In some examples, when a white L255 picture is displayed on the touch panel, the resulting touch signal amount is 10, and when a skip pixel picture is displayed on the touch panel, the resulting touch signal amount is 50. The picture level of the white L255 picture is determined as the eighth picture level, and the corresponding touch report threshold is 15. The picture level of the skip pixel picture is determined as the second picture level, and the corresponding touch report threshold is 60.

In some embodiments, the touch report threshold corresponding to each picture level is greater than the corresponding touch signal amount, in order to avoid mistaken touch while ensuring the touch sensitivity.

In some embodiments, for each picture, steps of the method for setting a touch report threshold are at least executed once. For example, it is set that, for each picture, steps of the method for setting a touch report threshold are executed once. Since the picture data is transmitted and displayed in unit of frames, the content of each picture is kept unchanged, and the execution frequency is equal to the frame frequency for picture displaying. This may reduce the power consumption of hardware while adjusting the touch report threshold at each picture position accurately and in real time.

The steps of the method for setting a touch report threshold will be described by taking, as an example, a case in which: a 1600 RGB×2560 8-inch liquid crystal display is used together with a touch sensor having 32 Tx×20 Rx channels, eight picture levels are preset (the first level is the super heavy load picture level, the second to sixth picture levels are heavy load picture levels, and the seventh and eighth picture levels are light load picture levels), and a % and b % are both 80%.

First, by the preset correspondence between the N picture levels and touch report thresholds for the touch panel sample, some of relations are obtained, which are listed in Table 1.

TABLE 1

| Example of pictures | Picture level | Touch signal amount (max) caused by noise | touch report threshold |
|---|---|---|---|
| Skip sub-pixel picture | first | viii | VIII |
| Skip pixel picture | second | vii | VII |
| Skip 1V line picture | third | vi | VI |
| ...... | ...... | ...... | ...... |
| W L255 picture | eighth | i | I |

In the initial state, in default, the touch report threshold of the touch sensor node corresponding to the position of each picture unit is the touch report threshold I corresponding to the eighth picture level. Gray scale variations of a picture to be displayed are collected, and the picture to be displayed is divided into two picture units according to the gray scale variations. For example, the first picture unit is the skip 1V line picture unit and the second picture unit is the W L255 picture unit.

Figure 11:
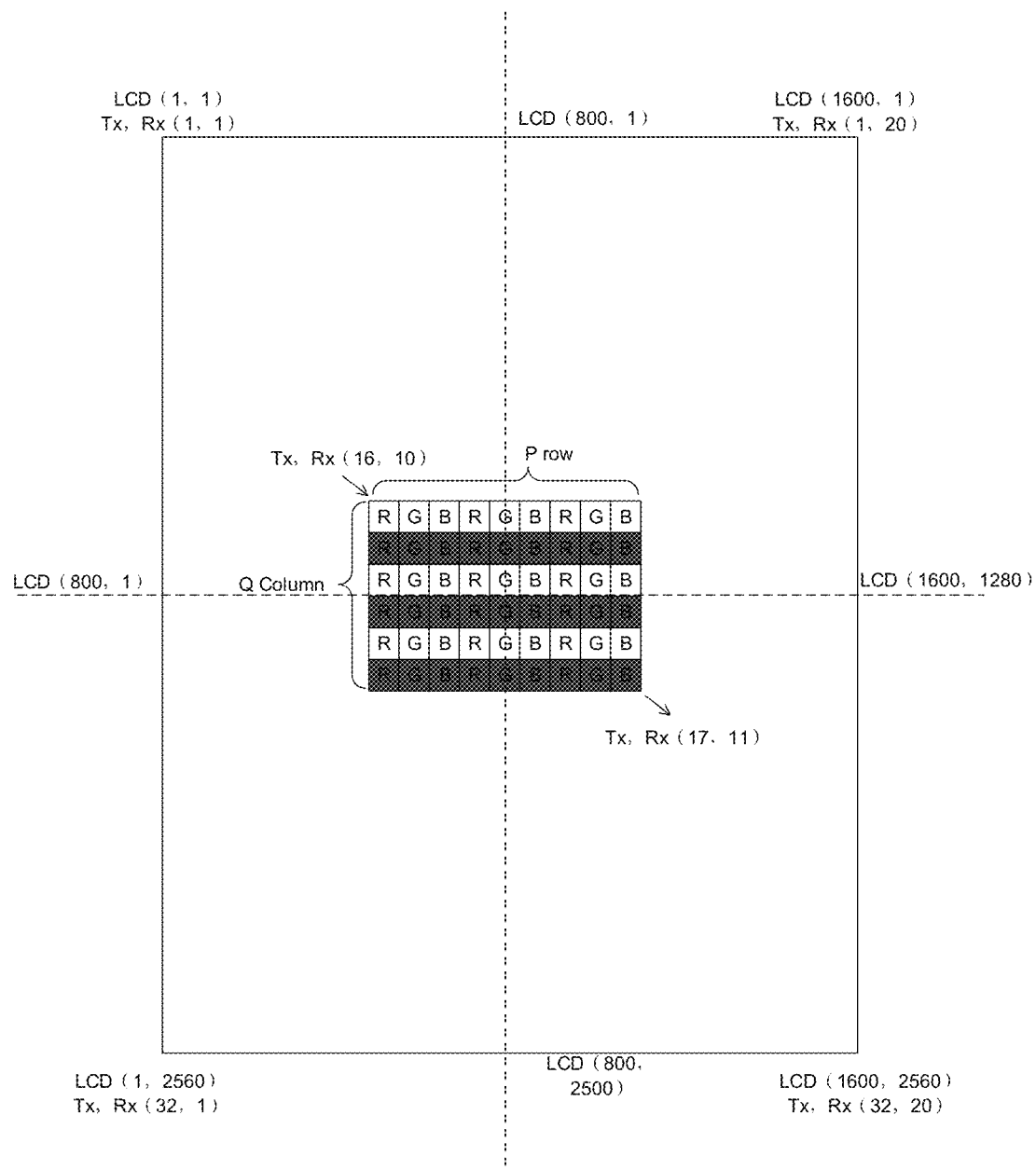
FIG. 11 is a schematic view of determining a position of a heavy load picture unit in the method for setting a touch report threshold, in accordance with some embodiments.

As shown in FIG. 11, the first picture unit is a skip 1V picture unit having P rows and Q columns of sub-pixels, which is recorded in the preset correspondence between the gray scale variations and N picture levels. Therefore, this picture unit can be directly determined to be in the third picture level, and thus is a heavy load picture unit. The touch sensor channel corresponding to the position of this heavy load picture unit is determined to determine the position of this heavy load picture unit. That is, the coordinates of a pixel in center of this heavy load picture unit are determined as (800, 1280). The touch sensor channel corresponding to the heavy load picture unit is a region, the Tx and Rx coordinates of which are (16, 10) to (17, 11). And, the touch report threshold at the position of this region is adjusted to VI.

The second picture unit is the W L255 picture unit. According to the preset correspondence between the gray scale variations and the picture levels, this picture unit can be determined to be in the eighth picture level, and thus this picture unit is a light load picture unit. The touch sensor channel corresponding to this light load picture unit is determined (the steps are similar to those for the first picture unit, and will not be elaborated) to determine the position of this light load picture unit, and then the touch report threshold at this position is adjusted to I.

In the embodiments of the present disclosure, it will be understood that the method flows for realizing various functions in different examples may be integrated together to form an independent part, or they may exist separately, or two or more than two of them may be integrated together to form an independent part.

Figure 12:
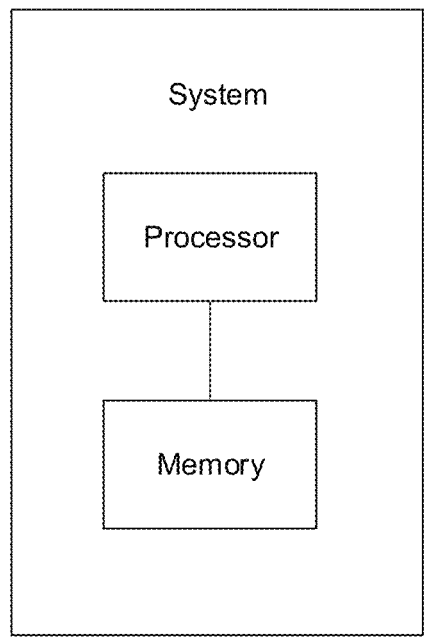
FIG. 12 is a structural diagram of a system for setting a touch report threshold, in accordance with some embodiments.

Referring to FIG. 12, some embodiments of the present disclosure provide a system for setting a touch report threshold, and the system includes a memory and a processor coupled to the memory. The memory is configured to store a preset correspondence between gray scale variations and N picture levels and a preset correspondence between the N picture levels and touch report thresholds. N is a positive integer and N is greater than or equal to 2. The processor is configured to collect gray scale variations of a picture to be displayed; divide, according to the gray scale variations and the N picture levels, the picture to be displayed into at least one picture unit, and determine, according to the preset correspondence between gray scale variations and the N picture levels, a picture level corresponding to the at least one picture unit; determine a touch sensor channel corresponding to the at least one picture unit to determine the position of the at least one picture unit; and adjust, according to the preset correspondence between the N picture levels and touch report thresholds, a touch report threshold at the position of at least one of the at least one picture unit in real time.

The beneficial effects that can be realized by the system for setting a touch report threshold in the present disclosure are the same as the beneficial effects that can be realized by the method for setting a touch report threshold, and will not be elaborated.

In some embodiments, the collection frequency of the processor is greater than or equal to the frame frequency for picture displaying. This may reduce the power consumption of hardware while adjusting the touch report threshold at the position of each picture unit accurately and in real time.

In some embodiments, the memory is integrated in a touch chip (Touch IC) of a touch panel.

Some embodiments of the present disclosure provide a non-transitory computer-readable storage medium, storing executable instructions that, when executed by a processor, enables the processor to execute the method for setting a touch report threshold in the above embodiments.

Figure 13:
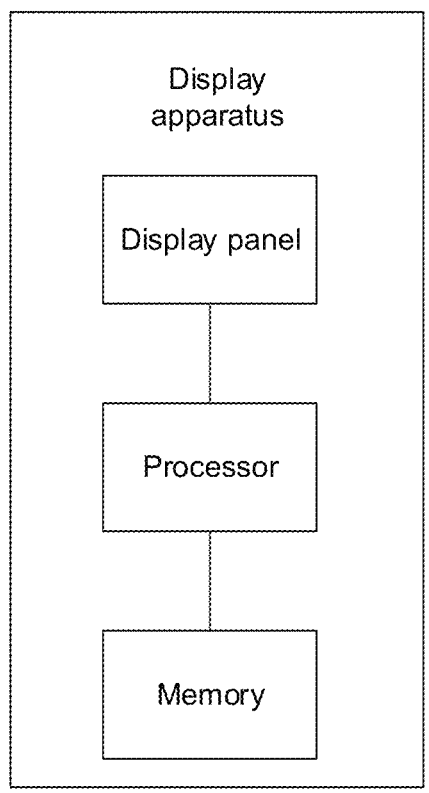
FIG. 13 is a structural diagram of a display apparatus, in accordance with some embodiments.

Some embodiments of the present disclosure provide a display apparatus, and as shown in FIG. 13, the display apparatus includes a display panel, a processor coupled to the display panel and a memory coupled to the processor. The memory is configured to store a preset correspondence between gray scale variations and N picture levels and a preset correspondence between the N picture levels and touch report thresholds. N is a positive integer and N is greater than or equal to 2. The processor is configured to: collect gray scale variations of a picture to be displayed; divide, according to the gray scale variations and the N picture levels, the picture to be displayed into at least one picture unit; determine, according to a preset correspondence between gray scale variations and N picture levels, a picture level corresponding to at least one picture unit; determine a touch sensor channel corresponding to the at least one picture unit to determine the position of the at least one picture unit; and adjust, according to the preset correspondence between the N picture levels and touch report thresholds, a touch report threshold at the position of at least one of the at least one picture unit in real time. The display panel is configured to display a picture with at least one adjusted touch report threshold.

The display apparatus is, for examples, an apparatus having a display function, such as a mobile phone, a tablet, a laptop, a palmtop or a television.

The foregoing descriptions merely show some implementations of the present disclosure, and the protection scope of the present disclosure is not limited thereto. A person of skill in the art can readily conceive of variations or replacements within the technical scope disclosed by the embodiments of the present disclosure, and these variations or replacements shall fall into the protection scope of the present disclosure. Accordingly, the protection scope of the present disclosure shall be subject to the protection scope of the claims.

What is claimed is:

1. A method for setting a touch report threshold, the method comprising:

collecting gray scale variations of a picture to be displayed;

dividing, according to the gray scale variations and N picture levels, the picture to be displayed into at least one picture unit, wherein N is a positive integer and N is greater than or equal to 2;

determining, according to a preset correspondence between gray scale variations and the N picture levels, a picture level corresponding to the at least one picture unit;

determining a touch sensor channel corresponding to the at least one picture unit to determine a position of the at least one picture unit; and adjusting, according to a preset correspondence between the N picture levels and touch report thresholds, a touch report threshold at a position of at least one of the at least one picture unit in real time: wherein dividing, according to the gray scale variations and N picture levels, the picture to be displayed into at least one picture unit, includes:

performing following determination on all sub-pixels corresponding to the picture to be displayed one by one: determining whether there is at least one gray scale variation greater than or equal to $A \times j/N$ between a sub-pixel and sub-pixels around the sub-pixel, wherein A is a gray scale variation for a sub-pixel from all black to all white, N is the number of picture levels, j is a preset parameter and is greater than 0 and less than or equal to N−1, A, N and j are all positive integers; if for the sub-pixel, there is at least one gray scale variation greater than or equal to $A \times j/N$, counting the sub-pixel and recording gray scale variations of the sub-pixel; and if for the sub-pixel, there is no gray scale variation greater than or equal to $A \times j/N$, not counting the sub-pixel and performing determination on a next sub-pixel;

determining whether a region where continuously counted sub-pixels are located has rows, the number of which is greater than that of rows of sub-pixels located in a preset region, and columns, the number of which is greater than that of columns of the sub-pixels located in the preset region; if so, determining the region where the continuously counted sub-pixels are located as a first picture unit; and if not, determining the region where the continuously counted sub-pixels are located as a second picture unit, wherein the preset region is within a minimum region of a touch panel in which noise of signals will affect the touch sensor; and determining, as a second picture unit, a region where sub-pixels that are not counted are located.

2. The method for setting a touch report threshold according to claim 1, wherein each picture level corresponds to at least one gray scale variation, and a gray scale variation corresponding to an i-th picture level is less than a gray scale variation corresponding to an (i−1)-th picture level, wherein i is greater than or equal to 2 and less than or equal to N, and i is a positive integer.

3. The method for setting a touch report threshold according to claim 2, wherein determining, according to a preset correspondence between gray scale variations and the N picture levels, a picture level corresponding to the at least one picture unit, includes:

determining whether gray scale variations of each picture unit are within one of gray scale variation ranges;

if the gray scale variations of the picture unit are within one of the gray scale variation ranges, determining, according to a preset correspondence between the gray scale variation ranges and the N picture levels, a picture level corresponding to the picture unit; and if at least one of the gray scale variations of the picture unit is not within one of the gray scale variation ranges, determining, according to the gray scale variations of the picture unit, a picture level corresponding to the picture unit.

4. The method for setting a touch report threshold according to claim 3, wherein determining, according to the gray scale variations of the picture unit, a picture level corresponding to the picture unit, includes:

for the first picture unit:

counting the number of sub-pixels each having at least one gray scale variation greater than or equal to A×(N−k)/N in all sub-pixels in the first picture unit;

determining whether the number of the sub-pixels is greater than or equal to a % of the number of sub-pixels in the first picture unit, wherein a is a positive integer;

if so, determining a picture level corresponding the first picture unit as a k-th picture level, wherein k is greater than or equal to 1 and is a positive integer;

if not, adding 1 to a value of k, and executing above steps again; and for the second picture unit:

setting a picture level of the second picture unit as a (j+1)-th picture level.

5. The method for setting a touch report threshold according to claim 2, wherein a first to m-th picture levels in the N picture levels are dead pixel picture levels, and picture units corresponding to the dead pixel picture levels are super heavy load picture units, wherein m is a positive integer and m is greater than or equal to 1 and less than or equal to N;

adjusting a touch report threshold at the position of at least one of the at least one picture unit in real time, includes:

determining, according to a picture level of the at least one picture unit, whether at least one of the at least one picture unit is at least one super heavy load picture unit; and if at least one of the at least one picture unit is at least one super heavy load picture unit, determining whether a ratio of an area of the at least one super heavy load picture unit to an area of the picture to be displayed is greater than or equal to b %, wherein b is a positive number;

if the ratio of the area of the at least one super heavy load picture unit to the area of the picture to be displayed is greater than or equal to b %, adjusting a touch report threshold of the picture to be displayed to a touch report threshold corresponding to a picture unit with a first picture level;

if the ratio of the area of the at least one super heavy load picture unit to the area of the picture to be displayed is less than b %, fitting an actual touch trajectory by using touch nodes around each super heavy load picture unit; and if any picture unit is not a super heavy load picture unit, determining the picture unit as a non-super heavy load picture unit.

6. The method for setting a touch report threshold according to claim 5, wherein adjusting a touch report threshold at the position of at least one of the at least one picture unit in real time, further includes:

for each non-super heavy load picture unit:

determining, according to the preset correspondence between the N picture levels and the touch report thresholds, a touch report threshold corresponding to a picture level of the non-super heavy load picture unit, and adjusting a touch report threshold at a position of the non-super heavy load picture unit to the determined touch report threshold.

7. The method for setting a touch report threshold according to claim 5, wherein adjusting a touch report threshold at the position of at least one of the at least one picture unit in real time further includes:

for each non-super heavy load picture unit:

determining whether the non-super heavy load picture unit is a light load picture unit, wherein n-th to N-th picture levels in the N picture levels are light load picture levels, and picture units corresponding to the light load picture levels are light load picture units, wherein n is greater than m and is less than or equal to N;

if the non-super heavy load picture unit is a light load picture unit, adjusting a touch report threshold at a position of the light load picture unit to a touch report threshold corresponding to the n-th picture level; and if the non-super heavy load picture unit is not the light load picture unit, determining, according to the preset correspondence between the N picture levels and the touch report thresholds, a touch report threshold corresponding to a picture level of a non-light load picture unit in the non-super heavy load picture unit, and adjusting a touch report threshold at a position of the non-light load picture unit to the determined touch report threshold.

8. The method for setting a touch report threshold according to claim 1, further comprising:

determining the preset correspondence between the N preset picture levels and the touch report thresholds.

9. The method for setting a touch report threshold according to claim 8, wherein determining the preset correspondence between the N preset picture levels and the touch report thresholds includes:
- selecting a touch panel sample;
- displaying, on the touch panel sample, pictures of the N picture levels one by one;
- testing a touch signal amount, which is caused by noise generated during a charge/discharge of driving transistor switch(es) in the touch panel sample, during displaying of a picture of each picture level of the N picture levels on the touch panel sample; and
- determining, according to the tested touch signal amount, a touch report threshold corresponding to the picture level.

10. The method for setting a touch report threshold according to claim 9, wherein
the touch panel sample is a touch panel sample having a maximum touch signal amount caused by noise when a same heavy load picture is displayed in all touch panel samples to be selected, wherein the heavy load picture is a picture having gray scale variations greater than a set value.

11. The method for setting a touch report threshold according to claim 10, wherein a touch report threshold corresponding to each picture level is greater than a corresponding touch signal amount.

12. The method for setting a touch report threshold according to claim 1, wherein, for each picture, steps of the method for setting a touch report threshold are at least executed once.

13. A non-transitory computer-readable storage medium storing executable instructions that, when executed by a processor, enables the processor to execute the method for setting a touch report threshold according to claim 1.

14. A system for setting a touch report threshold, the system comprising:
- a memory configured to store a preset correspondence between gray scale variations and N picture levels and a preset correspondence between the N picture levels and touch report thresholds, wherein N is a positive integer and N is greater than or equal to 2; and
- a processor coupled to the memory and configured to:
- collect gray scale variations of a picture to be displayed;
- divide, according to the gray scale variations and the N picture levels, the picture to be displayed into at least one picture unit,
- determine, according to the preset correspondence between gray scale variations and N picture levels, a picture level corresponding to the at least one picture unit;
- determine a touch sensor channel corresponding to the at least one picture unit to determine a position of the at least one picture unit; and
- adjust, according to the preset correspondence between the N picture levels and touch report thresholds, a touch report threshold at a position of at least one of the at least one picture unit in real time; wherein
- dividing, according to the gray scale variations and N picture levels, the picture to be displayed into at least one picture unit, includes:
- performing following determination on all sub-pixels corresponding to the picture to be displayed one by one: determining whether there is at least one gray scale variation greater than or equal to A×j/N between a sub-pixel and sub-pixels around the sub-pixel, wherein A is a gray scale variation for a sub-pixel from all black to all white, N is the number of picture levels, j is a preset parameter and is greater than 0 and less than or equal to N−1, A, N and j are all positive integers; if for the sub-pixel, there is at least one gray scale variation greater than or equal to A×j/N, counting the sub-pixel and recording gray scale variations of the sub-pixel; and if for the sub-pixel, there is no gray scale variation greater than or equal to A×j/N, not counting the sub-pixel and performing determination on a next sub-pixel;
- determining whether a region where continuously counted sub-pixels are located has rows, the number of which is greater than that of rows of sub-pixels located in a preset region, and columns, the number of which is greater than that of columns of the sub-pixels located in the preset region; if so, determining the region where the continuously counted sub-pixels are located as a first picture unit; and if not, determining the region where the continuously counted sub-pixels are located as a second picture unit, wherein the preset region is within a minimum region of a touch panel in which noise of signals will affect the touch sensor; and
- determining, as a second picture unit, a region where sub-pixels that are not counted are located.

15. The system for setting a touch report threshold according to claim 14, wherein a collection frequency of the processor is greater than or equal to a frame frequency for picture displaying.

16. The system for setting a touch report threshold according to claim 14, wherein the memory is integrated in a touch chip of a touch panel.

17. A display apparatus, comprising:
- a memory, configured to store a preset correspondence between gray scale variations and N picture levels and a preset correspondence between the N picture levels and touch report thresholds, wherein N is a positive integer and N is greater than or equal to 2;
- a processor, coupled to the memory and configured to:
- collect gray scale variations of a picture to be displayed;
- divide, according to the gray scale variations and N picture levels, the picture to be displayed into at least one picture unit;
- determine, according to the preset correspondence between gray scale variations and N picture levels, a picture level corresponding to the at least one picture unit;
- determine a touch sensor channel corresponding to the at least one picture unit to determine a position of the at least one picture unit; and
- adjust, according to the preset correspondence between the N picture levels and the touch report thresholds, a touch report threshold at a position of at least one of the at least one picture unit in real time; and
- a display panel coupled to the processor, wherein the display panel is configured to display a picture with at least one adjusted touch report threshold; wherein
- dividing, according to the gray scale variations and N picture levels, the picture to be displayed into at least one picture unit, includes:
- performing following determination on all sub-pixels corresponding to the picture to be displayed one by one: determining whether there is at least one gray scale variation greater than or equal to A×j/N between a sub-pixel and sub-pixels around the sub-pixel, wherein A is a gray scale variation for a sub-pixel from all black to all white, N is the number of picture levels, j is a preset parameter and is greater than 0 and less than or equal to N−1, A, N and j are all positive integers; if for the sub-pixel, there is at least one gray scale variation greater than or equal to A×j/N, counting the sub-pixel and recording gray scale variations of the sub-pixel; and if for the sub-pixel, there is no gray scale variation greater than or equal to A×j/N, not counting the sub-pixel and performing determination on a next sub-pixel;

determining whether a region where continuously counted sub-pixels are located has rows, the number of which is greater than that of rows of sub-pixels located in a preset region, and columns, the number of which is greater than that of columns of the sub-pixels located in the preset region; if so, determining the region where the continuously counted sub-pixels are located as a first picture unit and if not, determining the region where the continuously counted sub-pixels are located as a second picture unit, wherein the preset region is within a minimum region of a touch panel in which noise of signals will affect the touch sensor; and determining, as a second picture unit, a region where sub-pixels that are not counted are located.

\* \* \* \* \*